United States Patent [19]

Sanns, Jr.

[11] Patent Number: 4,954,537

[45] Date of Patent: Sep. 4, 1990

[54] INTERNAL MOLD RELEASE AGENT FOR USE IN POLYUREA RIM SYSTEMS

[75] Inventor: Frank Sanns, Jr., Pittsburgh, Pa.

[73] Assignee: Mobay Corporation, Pittsburgh, Pa.

[21] Appl. No.: 362,906

[22] Filed: Jun. 8, 1989

[51] Int. Cl.$^5$ .............................................. C08G 18/14
[52] U.S. Cl. .................................... 521/157; 521/163; 521/167; 528/49; 528/74.5; 528/76; 264/51; 264/328.1; 264/328.6; 264/328.8; 252/182.26; 252/182.27; 252/182.28
[58] Field of Search ....................... 521/157, 163, 167; 528/49, 74.5, 76; 264/51, 328.1, 328.6, 328.8; 252/182.26, 182.27, 182.28

[56] References Cited

U.S. PATENT DOCUMENTS

| | | | |
|---|---|---|---|
| 3,726,952 | 4/1973 | Boden et al. | 264/48 |
| 4,058,492 | 11/1977 | von Bonin et al. | 260/2.5 |
| 4,098,731 | 7/1978 | von Bonin et al. | 521/51 |
| 4,201,847 | 5/1980 | Kleimann et al. | 521/172 |
| 4,254,228 | 3/1981 | Kleimann et al. | 521/128 |
| 4,396,729 | 8/1983 | Dominquez et al. | 521/51 |
| 4,433,067 | 2/1984 | Rice et al. | 521/51 |
| 4,444,910 | 4/1984 | Rice et al. | 521/51 |
| 4,519,965 | 5/1985 | Taylor et al. | 264/51 |
| 4,530,941 | 7/1985 | Turner et al. | 521/176 |
| 4,581,386 | 4/1986 | Taylor et al. | 521/125 |
| 4,774,263 | 10/1988 | Weber et al. | 521/51 |

FOREIGN PATENT DOCUMENTS

1365215  5/1972  United Kingdom .

*Primary Examiner*—Maurice J. Welsh
*Attorney, Agent, or Firm*—Joseph C. Gil; Thomas W. Roy

[57] ABSTRACT

The present invention is directed to a process for the production of optionally cellular, polyurea elastomer moldings by reacting a reaction mixture containing
(I) a polyisocyanate,
(II) a polyether having at least two isocyanate-reactive groups and a molecular weight of 1800 to 12,000 in which at least 50% of the isocyanate-reactive groups are primary and/or secondary amino groups,
(III) about 5 to 50% by weight, based on the weight of component (II) of a chain extender comprising a sterically hindered aromatic diamine and
(IV) about 1 to 20% by weight, based on the weight of components (II) and (III) of an active hydrogen-containing fatty acid ester having a molecular weight of about 500 to 5000 and prepared by reacting an alcohol with an aliphatic, saturated or unsaturated fatty acid, said ester being characterized in that at least one aliphatic acid which contains more than eight carbon atoms is built into the molelcule, said ester further characterized as having an acid number of 0 to 100 and a hydroxyl number of 0 to 150 with at least one of said numbers being greater than 0,
wherein the fatty acid ester is initially blended with component (II), component (III) or a mixture thereof and the reaction mixture is processed as a one-shot system by the RIM process at an isocyanate index of about 70 to 130.

The present invention is also directed to an isocyanate-reactive component for use in a RIM process based on components (II), (III) and (IV).

22 Claims, No Drawings

INTERNAL MOLD RELEASE AGENT FOR USE IN POLYUREA RIM SYSTEMS

BACKGROUND OF THE INVENTION

1. Field of the Invention

The present invention relates to an internal mold release agent for use in a reaction injection molding process for the preparation of optionally cellular, polyurea elastomer moldings.

2. Description of the Prior Art

Reaction injection molding processes for the production of optionally cellular polyurea elastomers have been described in U.S. Pat. Nos. 4,433,067, 4,444,910, 4,530,941 and 4,774,263. In addition, U.S. Pat. No. 4,396,729 discloses polysiloxane internal mold release agents for use in the production of polyurea elastomers. Finally, U.S. Pat. Nos. 4,519,965 and 4,581,386 are directed to the use of internal mold release agent mixtures for either polyurethane and/or polyurea elastomers which are based on a zinc carboxylate and a solubilizer to maintain the zinc carboxylate in solution in the isocyanate-reactive component used to prepare the elastomer.

One of the problems with this latter mold release agent mixture, especially in systems for the preparation of polyurea elastomers, is the difficulty of maintaining the zinc carboxylate in solution without precipitation. Further, parts prepared using the zinc carboxylate-based internal mold release agent mixture require special treatment after they are removed from the mold and before painting in order to remove excess mold release agent from the surface of the part to improve its paintability.

It is an object of the present invention to provide an internal mold release agent which does not suffer from the disadvantages of the prior art mold release agents when used for the production of polyurea elastomers. It has surprisingly been found that this object may be achieved in accordance with the present invention by using certain fatty acid polyesters described hereinafter as internal mold release agents in the production of optionally cellular, polyurea elastomers.

U.S. Pat. Nos. 4,201,847 and 4,254,228 both describe an internal mold release agent based on the reaction product of an organic polyisocyanate and a fatty acid ester for use primarily in the production of polyurethane elastomers. These references disclose that the fatty acid ester itself is not stable and forms an incompatible mixture with either the polyisocyanate or the polyol components used as starting materials. Accordingly, it is surprising that in accordance with the present invention these fatty acid esters remain stably dispersed in the isocyanate-reactive component used for the preparation of the polyurea elastomers.

U.S. Pat. No. 4,774,263 is directed to the production of polyurea elastomers using a mold release agent. This reference discloses that suitable mold release agents are the salts of fatty acids having at least 12 carbon atoms and either primary mono-, di- or polyamines containing 2 or more carbon atoms or amines containing amide or ester groups and having at least one primary, secondary or tertiary amino group according to U.S. Pat. No. 3,726,952; blends of two or more of the following in accordance with British Patent No. 1,365,215: (1) esters of monofunctional and/or polyfunctional carboxylic acids which contain —COOH and/or —OH groups and have OH or acid numbers of at least 5, (2) natural or synthetic oils, fats or waxes and (3) salts according to U.S. Pat. No. 3,726,952; salts of saturated or unsaturated aliphatic or cycloaliphatic carboxylic acids having at least 8 carbon atoms and tertiary amines which do not contain amide or ester groups in accordance with U.S. Pat. No. 4,098,731; and reaction products of ricinoleic acid and long chain fatty acids in accordance with U.S. Pat. No. 4,058,492.

SUMMARY OF THE INVENTION

The present invention is directed to a process for the production of optionally cellular, polyurea elastomer moldings by reacting a reaction mixture containing (I) a polyisocyanate, (II) a polyether having at least two isocyanate-reactive groups and a molecular weight of 1800 to 12,000 in which at least 50% of the isocyanate-reactive groups are primary and/or secondary amino groups, (III) about 5 to 50% by weight, based on the weight of component (II) of a chain extender comprising a sterically hindered aromatic diamine and (IV) about 1 to 20% by weight, based on the weight of components (II) and (III) of an active hydrogen-containing fatty acid ester having a molecular weight of about 500 to 5000 and prepared by reacting an alcohol with an aliphatic, saturated or unsaturated fatty acid, said ester being characterized in that at least one aliphatic acid which contains more than eight carbon atoms is built into the molecule, said ester further characterized as having an acid number of 0 to 100 and a hydroxyl number of 0 to 150 with at least one of said numbers being greater than 0, wherein the fatty acid ester is initially blended with either component (II), component (III) or a mixture thereof and the reaction mixture is processed as a one-shot system by the RIM process at an isocyanate index of about 70 to 130.

The present invention is also directed to an isocyanate-reactive component for use in a RIM process based on components (II), (III) and (IV).

DETAILED DESCRIPTION OF THE INVENTION

As used herein, the term "polyurea" refers not only to pure polyureas, i.e., polyisocyanate polyaddition products prepared exclusively from polyisocyanates and polyamines, but also to polyisocyanate polyaddition products prepared from polyamines and other compounds containing isocyanate-reactive groups such as polyhydroxyl compounds, provided that at least 50% of the isocyanate-reactive groups are primary and/or secondary amino groups.

The polyisocyanate component (I) to be used in accordance with the present invention may be an aliphatic, cycloaliphatic, araliphatic or preferably an aromatic polyisocyanate, i.e., a polyisocyanate in which all of the isocyanate groups are aromatically bound. Examples of aromatic polyisocyanates include 2,4- and/or 2,6-diisocyanatotoluene; 2,2'-, 2,4'- and/or 4,4'-diisocyanatodiphenylmethane, mixtures of the last-mentioned isomers with their higher homologs (such as those obtained by phosgenating aniline/formaldehyde condensates); compounds containing urethane groups obtained as products of reaction of the above-mentioned di- and/or polyisocyanates with subequivalent quantities of aliphatic polyhydroxyl compounds having molecular weights of 62 to 700, (e.g. ethylene glycol, trimethylol propane, propylene glycol, dipropylene glycol or polypropylene glycols within the above-mentioned molecular weight range): di- and/or polyisocyanates modified by the partial carbodiimidization of the isocyanate groups of the above-mentioned di- and/or polyisocyanates; methyl-substituted diisocyanates of the diphenyl methane series or mixtures thereof (for example, those described in European Published application No. 0,024,665): or any mixtures of such aromatic di- and polyisocyanates.

Included among the preferred isocyanate starting materials are the derivatives of 4,4'-diisocyanatodiphenylmethane which are liquid at room temperature. Specific examples of such compounds are polyisocyanates containing urethane groups obtainable according to German Patent No. 1,618,380 (U.S. Pat. No. 3,644,457) by reacting one mole of 4,4'-diisocyanatodiphenylmethane with about 0.05 to 0.3 moles of low molecular weight diols or triols, preferably polypropylene glycols having a molecular weight below 700; and diisocyanates based on 4,4'-diisocyanatodiphenylmethane containing carbodiimide and/or uretone imine groups such as those disclosed in U.S. Pat. Nos. 3,152,162, 3,384,653, 3,449,256, and 4,154,752, and German Offenlegungsschrift No. 2,537,685. Also included among the preferred polyisocyanates are the corresponding modification products based on mixtures of 2,4'- and 4,4'-diisocyanatodiphenylmethane or mixtures of the above-described modified 4,4'-diisocyanatodiphenylmethanes with minor quantities of higher than difunctional polyisocyanates of the diphenylmethane series. Such polyisocyanates are described in German Offenlegungsschrift No. 2,624,526. The preferred polyisocyanates are generally polyisocyanates or polyisocyanate mixtures of the diphenylmethane series which are liquid at room temperature and have optionally been chemically modified as described above, have an average isocyanate functionality of 2 to 2.2 (preferably 2) and contain 4,4'-diisocyanatodiphenylmethane as the main component (preferably in an amount of more than 50% by weight).

Another group of preferred polyisocyanates are semi-prepolymers based on the above-mentioned monomeric polyisocyanates with subequivalent quantities of non-fatty, hydroxy polyesters. It has been disclosed in copending application that the use of these polyester-based semi-prepolymers (in place of the urethane group-containing polyisocyanates generally used for the preparation of RIM elastomers) results in polyurea elastomers which are not brittle at demold, even when processed at conventional mold temperatures. The semi-prepolymers have an isocyanate content of about 10 to 30% by weight, preferably about 15 to 25%. The polyisocyanate component generally contains at least 20% by weight, preferably at least 30% by weight and more preferably at least 40% by weight of these polyester-based prepolymers in order to obtain molded elastomers which are not brittle.

The hydroxy polyesters generally have a hydroxyl functionality of 1 to 4, preferably 2 to 3 and more preferably 2, and a molecular weight of about 500 to 4000, preferably about 500 to 2500. The hydroxy polyesters are based on the reaction products of polyhydric, preferably dihydric alcohols to which trihydric alcohols may be added, and mono- or polybasic, preferably dibasic carboxylic acids. Instead of free mono- or polycarboxylic acids, the corresponding mono- or polycarboxylic acid anhydrides or mono- or polycarboxylic acid esters of lower alcohols or mixtures thereof may be used for preparing the polyesters. The mono- or polycarboxylic acids may be aliphatic, cycloaliphatic, aromatic and/or heterocyclic and may be unsaturated and/or substituted, e.g. by halogen atoms. The aliphatic monocarboxylic acids are preferably non-fatty carboxylic acids containing less than 12, preferably 8 or less carbon atoms. Saturated, aliphatic dicarboxylic acids are preferred. Examples of suitable acids include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimethyl terephthalate and bis-glycol terephthalate. Suitable polyhydric alcohols include ethylene glycol, propylene glycol-(1,2) and -(1,3), butylene glycol-(1,4) and -(2,3), hexane diol-(1,6), octane diol-(1,8), neopentyl glycol, cyclohexane dimethanol (1,4-bishydroxymethyl-cyclohexane), 2-methyl-1,3-propane diol, glycerol, trimethylol propane, hexane triol-(1,2,6), butane triol-(1,2,4), trimethylol ethane, triethylene glycol, tetraethylene glycol, polyethylene glycols, dipropylene glycol, polypropylene glycol, dibutylene glycol and polybutylene glycols. The polyesters may also contain a proportion of carboxyl end groups. Polyesters of lactones, e.g. $\epsilon$-caprolactam, or hydroxy carboxylic acids, e.g. $\omega$-hydroxy caproic acid, may also be used. The semi-prepolymers are s prepared in known manner by adding a sufficient amount of the hydroxy polyester to the polyisocyanate to achieve the desired NCO content. It is also possible to mix the hydroxy polyester with a portion of the polyisocyanate to form an isocyanate-terminated prepolymer which is subsequently mixed with additional quantities of the polyisocyanate or a different polyisocyanate.

The polyethers (component II) to be used in accordance with the present invention contain at least two isocyanate-reactive groups in end positions and have an average molecular weight (calculated from the functionality and the isocyanate-reactive group content) of about 1800 to 12,000, preferably about 2000 to 8000. At least about 50 equivalent %, preferably about 80 to 100 equivalent % of the isocyanate-reactive end groups are primary and/or secondary (preferably primary) aromatically or aliphatically bound amino groups with the remainder being primary and/or secondary aliphatically bound hydroxyl groups. When polyether mixtures are used, individual components of the mixture may have a molecular weight below 1800 (for example between 500 and 1800), provided that the average molecular weight of the mixtures is within the range of 1800 to 12,000. The use of mixtures containing large quantities of individual components which have molecular weights below 1800 is, however, not preferred, even when the average molecular weight is within the disclosed ranges.

Compounds containing amino end groups may be prepared by the conversion of existing end groups or they may be attached to the polyether chain by urethane, ether or ester groups. Suitable polyether polyols for preparing the amine-terminated polyethers are known and disclosed in U.S. Pat. Nos. 4,305,857 and 4,218,543, both of which are herein incorporated by reference.

The "amino polyethers" may be prepared by known methods. One such method is the amination of polyhydroxy polyethers (e.g., polypropylene glycol ethers) by reaction with ammonia in the presence of Raney nickel and hydrogen (Belgium Patent No. 634,741). U.S. Pat. No. 3,654,370 discloses the preparation of polyoxyalkylene polyamines by reaction of the corresponding polyol with ammonia and hydrogen in the presence of a nickel, copper or chromium catalyst. The preparation of polyethers containing amino end groups by the hydrogenation of cyano-ethylated polyoxypropylene ethers is described in German Patent No. 1,193,671. Other methods for the preparation of polyoxyalkylene (polyether) amines are described in U.S. Pat. Nos. 3,155,728 and 3,236,895 and French Patent No. 1,551,605. French Patent No. 1,466,708 discloses the preparation of polyethers containing secondary amino end groups.

Relatively high molecular weight polyhydroxy polyethers suitable for the process of the present invention may be converted into the corresponding anthranilic acid esters by reaction with isatoic acid anhydride. German Offenlegungsschriften Nos. 2,019,432 and 2,619,840 and U.S. Pat. Nos. 3,808,250; 3,975,428; and 4,016,143 disclose methods for making polyethers containing aromatic end groups.

Relatively high molecular weight compounds containing amino end groups may be obtained according to German Offenlegungsschrift No. 2,546,536 or U.S. Pat. No. 3,865,791 by reacting isocyanate prepolymers based on polyhydroxy polyethers with hydroxyl-containing enamines, aldimines or ketimines and hydrolyzing the reaction product.

Amino polyethers which have been obtained by the hydrolysis of compounds containing isocyanate end groups (U.S. Pat. No. 4,774,263, herein incorporated by reference in its entirety) are preferred starting materials and can be used alone or in admixture with other amino polyethers, especially those obtained by the amination of polyether polyols. To prepare these amino polyethers by the hydrolysis of isocyanate groups, polyethers preferably containing two or three hydroxyl groups are reacted with excess quantities of polyisocyanates to form isocyanate-terminated prepolymers and the isocyanate groups are then converted in a second step into amino groups by hydrolysis. Other patents relating to the preparation of these amino polyethers include U.S. Pat. Nos. 4,532,317; 4,506,039; 4,540,270; 4,565,645; 4,525,534; 4,515,923; 4,525,590; 4,501,873; 4,578,500; 4,386,218; 4,472,568; 4,532,266; and 4,456,730. Additional methods are disclosed in European patent application Nos. 217,247; 178,525; 97,299; 75,770; 219,035; and 218,053.

Also preferred are polyethers containing amino phenoxy end groups and having a low viscosity. These aminopolyethers may be economically prepared in accordance with German Offenlegungsschrift No. 3,713,858, and may be used alone or in admixture with the other previously described aminopolyethers.

The "amino polyethers" used in accordance with the present invention are in many cases mixtures of the compounds described above. These mixtures generally should contain (on a statistical average) two to three isocyanate-reactive end groups. In the process of the present invention, the "amino polyethers" may also be used as mixtures with polyhydroxy polyethers which are free from amino groups (such as those previously disclosed as precursors for the amino polyethers, or highly branched polyether polyols having an average hydroxyl functionality of about 3 to 6 and molecular weights of about 500 to 1000), although such mixtures are less preferred. If such mixtures are used, however, it is necessary to ensure that at least about 50 equivalent % of the isocyanate reactive groups present in the mixture are primary and/or secondary amino groups. It is also possible to use mixed amino/hydroxyl polyethers, i.e., polyethers containing both amino and hydroxyl groups, provided that at least 50% of the isocyanate-reactive groups in the polyether component are primary and/or secondary amino groups. These mixed amino/hydroxyl polyethers may be prepared, e.g., by aminating only a portion of the hydroxyl groups of a polyether polyol.

Suitable chain extenders (component III) include the known low molecular isocyanate-reactive compounds such as aromatic polyamines, especially diamines, having molecular weights of less than about 800, preferably less than about 500.

Preferred chain extenders include the sterically hindered aromatic diamines which contain at least one linear or branched alkyl substituent in the ortho position to the first amino group and at least one, preferably two, linear or branched alkyl substituents containing at least one, preferably one to three carbon atoms in the ortho position to the second amino group. These aromatic diamines include 1-methyl-3,5-diethyl2,4-diaminobenzene, 1-methyl-3,5-diethyl-2,6-diaminobenzene, 1,3,5-trimethyl-2,4-diaminobenzene, 1-methyl5-t-butyl-2,4-diaminobenzene, 1-methyl-5-t-butyl-2,6diaminobenzene, 1,3,5-triethyl-2,4-diaminobenzene, 3,5,3', 5'-tetraethyl-4,4'-diaminodiphenylmethane, 3,5,3',5'-tetraisopropyl-4,4'-diaminodiphenylmethane, 3,5-diethyl-3', 5'-diisopropyl-4,4'-diaminodiphenylmethane, 3,3'-diethyl-5,5'-diisopropyl-4,4'-diaminodiphenylmethane, 1-methyl-2,6-diamino3-isopropylbenzene and mixtures of the above diamines. Most preferred are mixtures of 1-methyl-3,5-diethyl-2,4-diaminobenzene and 1-methyl-3,5-diethyl-2,6-diaminobenzene in a weight ratio between about 50:50 to 85:15, preferably about 65:35 to 80:20.

In addition, unhindered aromatic polyamines may be used in admixture with the sterically hindered chain extenders and include 2,4- and/or 2,6-diaminotoluene, 2,4'- and/or 4,4'-diaminodiphenylmethane, 1,2- and 1,4-phenylene diamine, naphthalene-1,5-diamine and triphenyl methane-4,4', 4''-triamine. The difunctional and polyfunctional aromatic amine compounds may also exclusively or partly contain secondary amino groups such as 4,4'-di-(methylamino)-diphenylmethane or 1-methyl-2-methylamino-4-aminobenzene. Liquid mixtures of polyphenyl polymethylene polyamines of the type obtained by condensing aniline with formaldehyde are also suitable. Generally the nonsterically hindered aromatic diamines and polyamines are too reactive to provide sufficient processing time in a RIM system. Accordingly, these diamines and polyamines should be used in combination with one or more of the previously mentioned sterically hindered diamines.

The chain extender (III) is used in quantities of about 5 to 50%, preferably about 8 to 30% and most preferably about 12 to 26% by weight, based on the weight of the high molecular weight isocyanate-reactive component (II).

Suitable fatty acid esters (IV) are in particular those in which at least one aliphatic acid which contains more than eight carbon atoms is built into the molecule and which have acid numbers of 0 to 100, preferably 0 to 40 and hydroxyl numbers of 0 to 150, preferably 0 to 75, wherein at least one of these two values is greater than 0. The fatty acid esters are generally present in an amount of about 1 to 20% by weight, preferably about 2 to 15% by weight and more preferably about 3 to 10% by weight, based on the weight of components (II) and (III), in order to obtain mold release properties.

The fatty acid esters used may also have the character of polyesters or mixed esters and may be prepared both from monofunctional and polyfunctional carboxylic acids and/or alcohols. The fatty acid esters may be prepared from several different types of fatty acids or carboxylic acids and/or alcohols so that fatty acid esters with an average molecular weight of about 500 to about 5000, preferably about 800 to 3000, are obtained by the process of mixed condensation.

Amines (blended with alcohols) or amino alcohols (optionally blended with alcohols) may also be used in the preparation of fatty acid esters and result in fatty acid mixed esters which contain basic or amide groups. These mixed esters are suitable for the process according to the invention. Such mixed esters can be obtained by using ammonia, monoalkyl amines or dialkylamines or their alkoxylation products (for example with ethylene oxide, propylene oxide or higher epoxides), or by using acid amides which contain carboxyl groups or alcohol groups. These acid amides may also be obtained by the amidation of carboxylic acids with monoalkanolamines or dialkanolamines such as ethanolamine, diethanolamine, propanolamine, dipropanolamine or the like. The fatty acid esters used for the reaction with the polyisocyanates are preferably those which can be prepared by esterifying carboxylic acids with alcohols or which can be obtained from natural substances. Suitable examples of alcohols include those set forth for the preparation of the polyester precursors of the polyisocyanate component and also butanol, hexanol, octanol isomers, dodecanol, oleyl alcohol, other fatty alcohols, natural or synthetic steroid alcohols, ricinoleic acid, pentaerythritol, sorbitol, hexitol, various sugars or addition products of alkylene oxides (such as ethylene oxide or propylene oxide) with these alcohols, and the like. Glycerol, trimethylol propane, pentaerythritol and sorbitol are particularly suitable.

The carboxylic acids used may be saturated or unsaturated, preferably aliphatic, and include octane carboxylic acids, dodecane acids, natural fatty acids such as ricinoleic acid, oleic acid, alaidic acid, stearic acid, palmitic acid, linoleic acid, linolenic acid, train oil fatty acids, fatty acids obtained from coconut oil, tallow fatty acids or fatty acids obtained by paraffin oxidation, tall oil fatty acids, succinic acid, maleic acid, citric acid, azelaic acid, adipic acid or higher dicarboxylic and polycarboxylic acids, oligomerization products of unsaturated carboxylic acids and addition products of maleic acid with natural and synthetic oils, and the like. The following are particularly suitable: oleic acid, linoleic acid, ricinoleic acid and adipic acid.

Preparation of the fatty acid esters is most suitably carried out by the co-condensation of the alcohols and acids at temperature above 100° C., preferably at about 120° to 180° C., optionally in a vacuum, the process of the elimination of water being continued until the desired hydroxyl and acid numbers or average molecular weights have been obtained. The process of esterification may, of course, be catalyzed with acid or basic catalysts and the water may be eliminated by azeotropic distillation. The products prepared and used according to the invention preferably contain hydroxyl and/or carboxylic acid groups.

Fatty acid esters which have been found to be particularly suitable for the process are the cocondensates of oleic acid with a dicarboxylic acid (such as adipic acid) and a polyfunctional alcohol (such as pentaerythritol), which have molecular weights of about 900 to 2500, hydroxyl numbers of about 30 to 70 and acid numbers of about 3 to 30.

There is not always a direct stoichiometric connection between the acid numbers and the hydroxyl numbers obtained and the molar ratios of the components used, possibly because side reactions of unknown type take place with the esterification.

Ricinoleic acid polyesters which have a molecular weight of between 800 and 2500 are of particular interest.

Auxiliary agents and additives including additional internal mold release agents, reinforcing agents, blowing agents, catalysts, surface active additives (emulsifiers and foam stabilizers), reaction retarders, cell regulators, fillers, pigments, flame retardant agents, age resistors, stabilizers to protect against weathering, plasticizers, fungistatic and bacteriostatic substances, may also be included in the compositions according to the present invention. Examples of these types of auxiliary agents and additives are set forth in U.S. Pat. Nos. 4,254,228 and 4,581,386, both of which are herein incorporated by reference in their entireties. In addition, these additives have been described in Kunststoff-Handbuch, Vol. VI, published by Vieweg and Höchtlen, Carl-Hanser-Verlag, Munich, 1966, e.g. on pages 103 to 113.

The compositions according to the present invention may be molded using conventional RIM processing techniques. In general, two separate streams are intimately mixed and subsequently injected into a suitable mold, although it is possible to use more than two streams. The first stream contains the polyisocyanate component (I), while the second stream contains the high molecular weight isocyanate-reactive component (II), the chain extender (III), the internal mold release agent (IV) and generally any other additive which is to be included.

Prior to use, the mold release agent may be blended with the remainder of the isocyanate-reactive components of the second stream and agitated briefly to ensure homogeneity. If used, a reinforcing agent may be added to the resin blend at this time.

The invention is further illustrated, but is not intended to be limited by the following examples in which all parts and percentages are by weight unless otherwise specified.

EXAMPLES

Description of Materials

Polyol A: A TMP/water-initiated (4.5:1 wt. ratio) hydroxy polyoxypropylene having an OH number of 56 and a functionality of 2.4.

Polyol B: A glycerine-initiated poly(oxyalkylene)-polyether triol having an OH number of 35 and prepared from 4.6% propylene oxide followed by 4.7% ethylene oxide, followed by 82.3% propylene oxide and, finally 8.4% ethylene oxide.

Polyol C: A mixture of two parts of Polyol A with one part of Polyol B.

Polyol D: A polyester polyol having a molecular weight of 2000 and based on adipic acid and a mixture of ethylene glycol and butylene glycol in a 1:1 molar ratio.

Polyol E: A glycerine-initiated poly(oxyalkylene)- polyether triol having an OH number of 35 and prepared from 83 wt. % propylene oxide followed by 17% ethylene oxide.

Amine-Terminated Polyether A: 1 mole of Polyol C was reacted with 2.6 moles of 2,4-toluylene diisocyanate to form an isocyanate-terminated prepolymer and the terminal isocyanate groups were subsequently converted to primary amino groups.

Amine-Terminated Polyether B: A blend of aliphatically-bound amine-terminated polyoxypropylenes having an average equivalent weight of about 1,000, an average functionality of about 2.5 and supplied by Texaco Chemical Company as Jeffamine LMT-3001.

Amine-Terminated Polyether C: A blend of aliphatically-bound amine-terminated polyoxypropylenes.

Amine-Terminated Polyether D: 1 mole of Polyol E was reacted with 3 moles of 2,4-toluylene diisocyanate to form an isocyanate-terminated prepolymer and the terminal isocyanate groups were subsequently converted to primary amino groups.

Chain Extender A: A commercial preparation of diethyl toluene diamine (DETDA) which is an isomeric mixture of 1-methyl-3,5-diethyl-2,4-diaminobenzene and 1-methyl-3,5-diethyl-2,6-diaminobenzene in a ratio between 65:35 and 80:20.

Cross-Linker A: An amine-initiated poly(oxyalkylene)polyether tetrol having a hydroxyl number of about 630 and obtained by the addition of about 5 moles of propylene oxide to one mole of ethylene diamine.

Fatty Acid Ester A: A polyester having an OH number of 50 and an acid number of 5 which was prepared from 2.5 moles of pentaerythritol, 6 moles of oleic acid and 1 mole of adipic acid.

Fatty Acid Ester B: A polyester having an OH number of about 33 and an acid number of 2 which was prepared by the condensation of ricinoleic acid in the presence of a minor amount of 1,6-hexane diol.

Fatty Acid Salt A: The tall oil salt of the amide group-containing compound obtained by reacting N,N-dimethylaminopropylamine with tall oil.

Surfactant A: A commercial silicone surfactant supplied as L-5304 by Union Carbide.

Additive A: A functional silane modifier identified as gamma-glycidoxypropyltrimethoxysilane and supplied by Dow Corning Corporation as Z-6040.

Polyisocyanate A: A mixture having an overall isocyanate content of 19% and based on 94% by weight of an isocyanate-terminated prepolymer prepared from 4,4'-diphenyl-methane diisocyanate and Polyol D and 6% of carbodiimidized 4,4'-diphenylmethane diisocyanate having an isocyanate equivalent weight of 143.

Polyisocyanate B: An aniline/formaldehyde condensation product containing 41% of 4,4'-diphenylmethane diisocyanate, 18% of the 2,4'-isomer, 2% of the 2,2'-isomer and the remainder higher functional homologs.

Polyisocyanate C: A mixture of 80 parts of Polyisocyanate A and 20 parts of Polyisocyanate B.

Polyisocyanate D: A liquid semi-prepolymer prepared by reacting 4,4'-diphenylmethane diisocyanate and tripropylene glycol in a molar ratio of about 5:1 to provide a product having an NCO content of about 23% and a viscosity at 25° C. of 725±175 cps.

Polyisocyanate E: An aniline/formaldehyde condensation product containing 44.4% of 4,4'-diphenylmethane diisocyanate, 19% of the 2,4'-isomer, 2.6% of the 2,2'-isomer and the remainder higher functional homologs.

Polyisocyanate F: A blend of 80 parts of Polyisocyanate A and 20 parts of Polyisocyanate E.

Polyisocyanate G: A mixture of 70 parts of Polyisocyanate F and 30 parts of Polyisocyanate D.

Polyisocyanate H: An aniline/formaldehyde condensation product containing 82.5% of 4,4'-diphenylmethanediisocyanate 5% of the 2,4'-isomer and the remainder higher functional homologs.

Polyisocyanate I: An isocyanate-terminated prepolymer having an NCO content of 20% and prepared from Polyisocyanate H and Polyol E.

Amine Catalyst A: Triethylene diamine, supplied as a 33% solution in a glycol carrier as Dabco 33 LV by Air Products.

EXAMPLE 1

A resin blend was prepared from 65 parts of Amine-Terminated Polyether A, 26 parts of Chain Extender A, 7.5 parts of Fatty Acid Ester A, 0.75 parts of Surfactant A, 0.75 parts of Additive A and 20% flakeglass (based on the total weight of the reaction mixture, including polyisocyanate), and reaction injection molded with 74.2 parts of Polyisocyanate C in a Cincinnati Milacron RIM-90 using a plaque tool.

| Mixhead Type | Adjustable |
| --- | --- |
| Injection Rate, pounds per second | 5.1 |
| Part Weight, pound | 5.7 |
| Mold Temperature, °F. | 150 |
| Resin Blend, specific gravity, g/cc | 1.256 |
| Material Temperature. °F. | |
| Polyisocyanate Component | 130 |
| Resin Component | 120–130 |
| Mix Pressures, psi | |
| Polyisocyanate Component | 1900–2000 |
| Resin Blend Component | 2000–2100 |
| Demold Time, seconds | 35 |

Prior to conducting the example, the surface of the mold was treated with an external soap release agent, Chem-Trend RCTW 2006. 14 releases were obtained before the experiment was voluntarily terminated. Very good release was obtained in all instances, green strength was acceptable and the surface quality of the parts was very good. The parts stiffened upon cooling and were somewhat brittle; however, brittleness was judged not to make the parts unacceptable. After the 10th plaque was molded and released from the mold, 0.1 parts of catalyst A were added to the resin blend.

EXAMPLE 2

Example 1 was repeated except that the amount of fatty acid A was reduced to 5.5 parts and 2 parts of Cross-Linker A was added. The amount of the polyisocyanate component was increased to 78.3 parts which increased the specific gravity of the resin blend to 1.261. Again, the reactants possessed good flow and very good release was obtained with good green strength. The parts were stiff at demold and further stiffened upon cooling; however, brittleness was judged not to make the parts unacceptable. 14 releases were obtained before the experiment was voluntarily terminated.

EXAMPLE 3

Example 2 was repeated except that the amounts of Cross-Linker A and Chain Extender A were adjusted to 3 and 30 parts, respectively, and Amine-Terminated Polyether A was replaced by 60 parts of a 50:50 mixture of Amine-Terminated Polyether B and Amine-Terminated Polyether D. The polyisocyanate was changed to 88 parts of Polyisocyanate F per 100 parts of resin blend. Parts molded from this composition gave good flowability, good green strength and good releasability. The run was voluntarily terminated after 14 demoldings.

EXAMPLE 4

Example 3 was repeated except that Polyisocyanate C was replaced by 86.05 parts of Polyisocyanate G. Parts molded from this composition were very stiff after demold, had good green strength and good releasability. The run was voluntarily terminated after 20 demoldings.

EXAMPLE 5

Example 1 was repeated using a resin blend of 70.5 parts of Amine-Terminated Polyether C, 23.5 parts of Chain-extender A, 5.5 parts of Fatty Acid Ester A, 0.5 parts of Surfactant A, 20% flakeglass (based on the total weight of the reaction mixture, including polyisocyanate) and 72.8 parts of Polyisocyanate I. Parts molded from this composition gave good flowability, adequate green strength and good release. The run was terminated after 16 demoldings; although some parts began sticking after the 13th demolding.

EXAMPLES 6-8

Example 1 was repeated using the following resin blends:

|  | Example 6 | Example 7 | Example 8 (Comparison) |
|---|---|---|---|
| Amine Terminated Polyether D | 65 | 65 | 65 |
| Chain Extender A | 26 | 26 | 26 |
| Fatty Acid Ester A | 7.5 |  |  |
| Fatty Acid Ester B |  | 7.5 |  |
| Fatty Acid Salt A |  |  | 7.5 |
| Surfactant A | 0.75 | 0.75 | 0.75 |
| Additive A | 0.75 | 0.75 | 0.75 |
| Flakeglass[1] % | 20 | 20 | 20 |
| Polyisocyanate J | 69.8 | 69.8 | 69.8 |

[1] % flakeglass is based on the total weight of the reaction mixture including polyisocyanate 15 parts were obtained in each example before the experiment was terminated. The results may be summarized as follows. The resin blend of Example 6 provided the best release; no pulls, i.e., surface defects caused by the parts sticking to the mold surface, were observed. The flowability of the reaction mixture was good, the green strength of the parts was fair and the surface quality of the parts was good. The resin blend of Example was similar in performance to that of Example 6. The green strength of the parts was better than Example 6 and their surface quality was fair to good. Releasability was less than in Example 6, but still good. On the eighth part some minor pulls were observed; however, spraying the mold with an external mold release agent before the remaining parts were prepared eliminated any further pulls.

The resin blend of Example 7 was difficult to run. The blend reacted too fast such that the part was hard to fill, i.e., flowability was bad. The mold had to be sealed, the shot weight had to be raised and the injection rate had to be increased to the maximum rate in order to fill the mold. The green strength of the parts was good, but pulls were observed on the fifth part. Thereafter, the mold had to be sprayed before every other part to ensure release; however, pulls were still observed. Thus, the surface quality was bad.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of an optionally cellular, polyurea elastomer molding which comprises reacting a reaction mixture containing
   (I) a polyisocyanate,
   (II) a polyether having at least two isocyanate-reactive groups and a molecular weight of 1800 to 12,000 in which at least 50% of the isocyanate-reactive groups are primary and/or secondary amino groups,
   (III) about 5 to 50% by weight, based on the weight of component (II), of a chain extender comprising a sterically hindered aromatic diamine and
   (IV) about 1 to 20% by weight, based on the weight of components (II) and (III), of an active hydrogen-containing fatty acid ester having a molecular weight of about 500 to 5000 and prepared by reacting an alcohol with an aliphatic, saturated or unsaturated fatty acid, said ester being characterized in that at least one aliphatic acid which contains more than 8 carbon atoms is built into the molecule, said ester further characterized as having an acid number of 0 to 100 and a hydroxyl number of 0 to 150 with at least one of said numbers being greater than 0, wherein said fatty acid ester is initially blended with component (II), component (III) or a mixture thereof and the reaction mixture is processed as a one-shot system by the RIM process at an isocyanate index of about 70 to 130.

2. The process of claim 1 wherein about 80 to 100% of the isocyanate-reactive groups of component (II) are primary and/or secondary amino groups.

3. The process of claim 1 wherein said chain extender comprises an isomeric mixture of 1-methyl-3,5-diethyl-2,4-diaminobenzene and 1-methyl-3,5-diethyl-2,6-diaminobenzene.

4. The process of claim 1 wherein said fatty acid ester (IV) has an acid number of 0 to 40, a hydroxyl number of to 75 and an average molecular weight of about 800 to 3000.

5. The process of claim 1 wherein said alcohol used to prepare said fatty acid ester (IV) comprises a low molecular weight polyol having 3 or more hydroxyl groups.

6. The process of claim 1 wherein said fatty acid ester IV comprises the reaction product of a fatty acid, a dicarboxylic acid and a low molecular weight polyol having 3 or more hydroxyl groups, said fatty acid ester having an average molecular weight of about 900 to 2500, a hydroxyl number of about 30 to 70 and an acid number of about 3 to 30.

7. The process of claim 1 wherein said reaction mixture additionally contains a reinforcing agent.

8. A process for the production of an optionally cellular, polyurea elastomer molding which comprises reacting a reaction mixture containing
   (I) a polyisocyanate which is liquid at room temperature,
   (II) a polyether having at least two isocyanate-reactive groups and a molecular weight of about 2000 to 8000 in which about 80% to 100% of the isocyanate-reactive groups are primary and/or secondary amino groups,
   (III) about 5 to 50% by weight, based on the weight of component (II) of a chain extender comprising an isomeric mixture of 1-methyl-3,5-diethyl-2,4-diamonobenzene and 1-methyl-3,5-diethyl-2,6-diamonobenzene and
   (IV) about 2 to 15% by weight, based on the weight of components (II) and (III) of an active hydrogen-containing fatty acid ester having a molecular weight of about 800 to 3000 and prepared by reacting an alcohol with an aliphatic, saturated or unsaturated fatty acid, said ester being characterized in that at least one aliphatic acid which contains more than 8 carbon atoms is built into the molecule, said ester further characterized as having an acid number of 0 to 40 and a hydroxyl number of 0 to 75, with at least one of said numbers being greater than 0,
   wherein said fatty acid ester is initially blended with component (II), component (III) or a mixture thereof and the reaction mixture is processed as a one-shot system by the RIM process at an isocyanate index of about 70 to 130.

9. The process of claim 8 wherein said alcohol used to prepare said fatty acid ester (IV) comprises a low molecular weight polyol having 3 or more hydroxyl groups.

10. The process of claim 8 wherein said fatty acid ester (IV) comprises the reaction product of a fatty acid, a dicarboxylic acid and a low molecular weight polyol having 3 or more hydroxyl groups, said fatty acid ester having an average molecular weight of about 900 to 2500, a hydroxyl number of about 30 to 70 and an acid number of about 3 to 30.

11. The process of claim 8 wherein said reaction mixture additionally contains a reinforcing agent.

12. An isocyanate-reactive component which is suitable for the production of an optionally cellular, polyurea elastomer molding and comprises
   (II) a polyether having at least two isocyanate-reactive groups and a molecular weight of 1800 to 12,000 in which at least 50% of the isocyanate-reactive groups are primary and/or secondary amino groups,
   (III) about 5 to 50% by weight, based on the weight of component (ii), of a chain extender comprising a sterically hindered aromatic diamine and
   (IV) about 1 to 20% by weight, based on the weight of components (II) and (III), of an active hydrogen-containing fatty acid ester having a molecular weight of about 500 to 5000 and prepared by reacting an alcohol with an aliphatic, saturated or unsaturated fatty acid, said ester being characterized in that at least one aliphatic acid which contains more than 8 carbon atoms is built into the molecule, said ester further characterized as having an acid number of 0 to 100 and a hydroxyl number of 0 to 150 with at least one of said numbers being greater than 0.

13. The isocyanate-reactive component of claim 12 wherein about 80 to 100% of the isocyanate-reactive groups of component (II) are primary and/or secondary amino groups.

14. The isocyanate-reactive component of claim 12 wherein said chain extender comprises an isomeric mixture of 1-methyl-3,5-diethyl-2,4-diamino-benzene and 1-methyl-3,5-diethyl-2,6-diaminobenzene.

15. The isocyanate-reactive component of claim 12 wherein said fatty acid ester (IV) has an acid number of 0 to 40, a hydroxyl number of 0 to 75 and an average molecular weight of about 800 to 3000.

16. The isocyanate-reactive component of claim 12 wherein said alcohol used to prepare said fatty acid ester (IV) comprises a low molecular weight polyol having 3 or more hydroxyl groups.

17. The isocyanate-reactive component of claim 12 wherein said fatty acid ester IV comprises the reaction product of a fatty acid, a dicarboxylic acid and a low molecular weight polyol having 3 or more hydroxyl groups, said fatty acid ester having an average molecular weight of about 900 to 2500, a hydroxyl number of about 30 to 70 and an acid number of about 3 to 30.

18. The isocyanate-reactive component of claim 12 which additionally comprises a reinforcing agent.

19. An isocyanate-reactive component which is suitable for the production of an optionally cellular, polyurea elastomer molding and comprises
   (II) a polyether having at least two isocyanate-reactive groups and a molecular weight of about 2000 to 8000 in which about 80% to 100% of the isocyanate-reactive groups are primary and/or secondary amino groups,
   (III) about 5 to 50% by weight, based on the weight of component (II) of a chain extender comprising an isomeric mixture of 1-methyl-3,5-diethyl-2,4-diamonobenzene and 1-methyl-3,5-diethyl-2,6-diamonobenzene and
   (IV) about 2 to 15% by weight, based on the weight of components (II) and (III), of an active hydrogen-containing fatty acid ester having a molecular weight of about 800 to 3000 and prepared by reacting an alcohol with an aliphatic, saturated or unsaturated fatty acid, said ester being characterized in that at least one aliphatic acid which contains more than 8 carbon atoms is built into the molecule, said ester further characterized as having an acid number of 0 to 40 and a hydroxyl number of 0 to 75, with at least one of said numbers being greater than 0.

20. The isocyanate-reactive component of claim 19 wherein said alcohol used to prepare said fatty acid ester (IV) comprises a low molecular weight polyol having 3 or more hydroxyl groups.

21. The isocyanate-reactive component of claim 19 wherein said fatty acid ester (IV) comprises the reaction product of a fatty acid, a dicarboxylic acid and a low molecular weight polyol having 3 or more hydroxyl groups, said fatty acid ester having an average molecular weight of about 900 to 2500, a hydroxyl number of about 30 to 70 and an acid number of about 3 to 30.

22. The isocyanate-reactive component of claim 19 which additionally comprises a reinforcing agent.

* * * * *